United States Patent [19]
Zahn

[11] 4,150,017

[45] Apr. 17, 1979

[54] DEVICE FOR RECORDING AND REPRODUCING SIGNALS WITH A TAPE-LIKE CARRIER

[75] Inventor: Heinrich Zahn, Rossdorf, Fed. Rep. of Germany

[73] Assignee: Robert Bosch Fernsehanlagen GmbH, Darmstadt, Fed. Rep. of Germany

[21] Appl. No.: 851,849

[22] Filed: Nov. 16, 1977

Related U.S. Application Data

[63] Continuation of Ser. No. 663,080, Mar. 2, 1976, abandoned.

[30] Foreign Application Priority Data

Mar. 8, 1975 [DE] Fed. Rep. of Germany ....... 2510166

[51] Int. Cl.² .......................... G11B 5/50; G11B 15/62
[52] U.S. Cl. .................................. 360/130.21; 360/84
[58] Field of Search ................ 360/130, 84; 269/289.1

[56] References Cited

U.S. PATENT DOCUMENTS

| 2,763,236 | 9/1956 | Cummings .................... 269/289.1 X |
| 3,516,146 | 6/1970 | Maxey .............................. 360/130 X |

*Primary Examiner*—John H. Wolff
*Attorney, Agent, or Firm*—Ernest F. Marmorek

[57] ABSTRACT

A device for recording and reproducing signals with a tape-like carrier by the inclined track method includes a support structure having a cavity defined therein, two substantially co-axial guide cylinders disposed in the cavity and a head wheel supporting recording and reproducing heads and disposed between the cylinders. The device is improved by disposing in the cavity circular supports engaging the cylinders.

2 Claims, 3 Drawing Figures

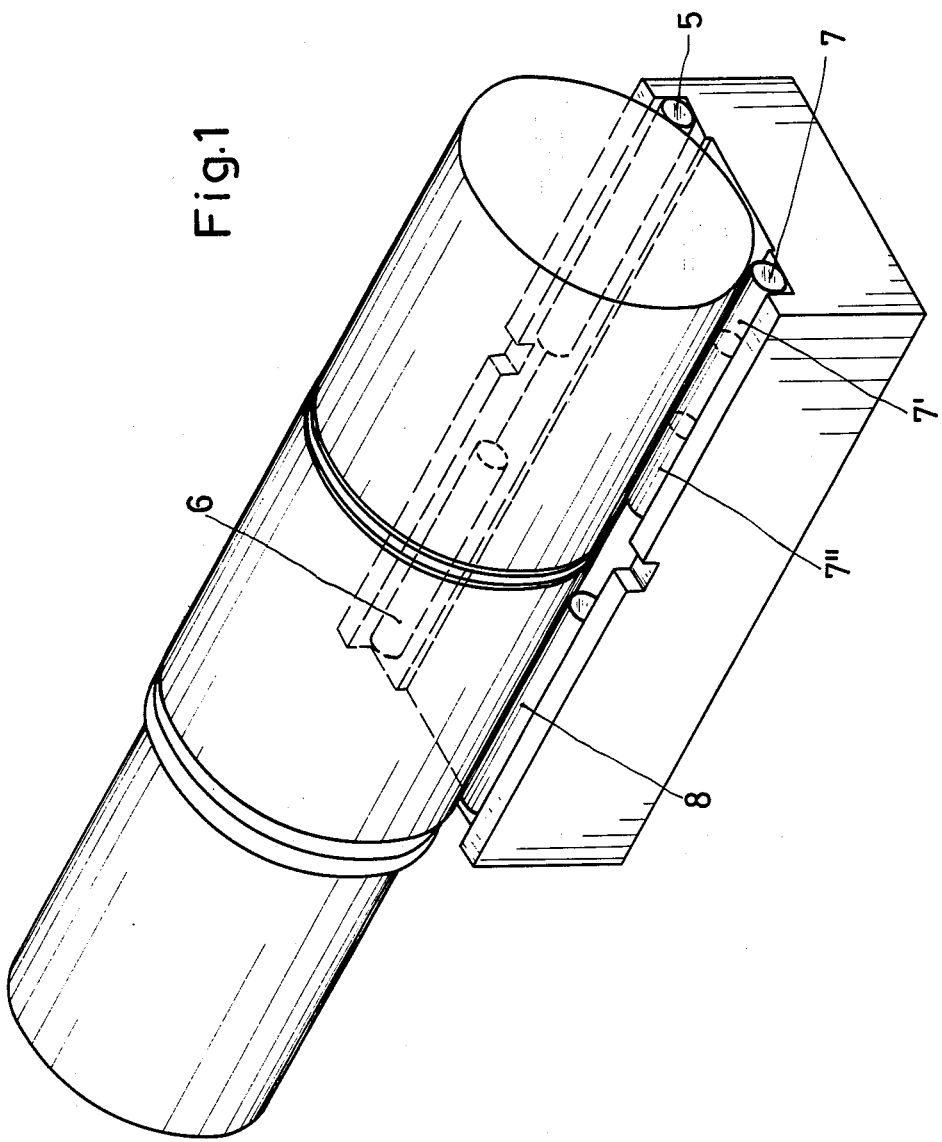

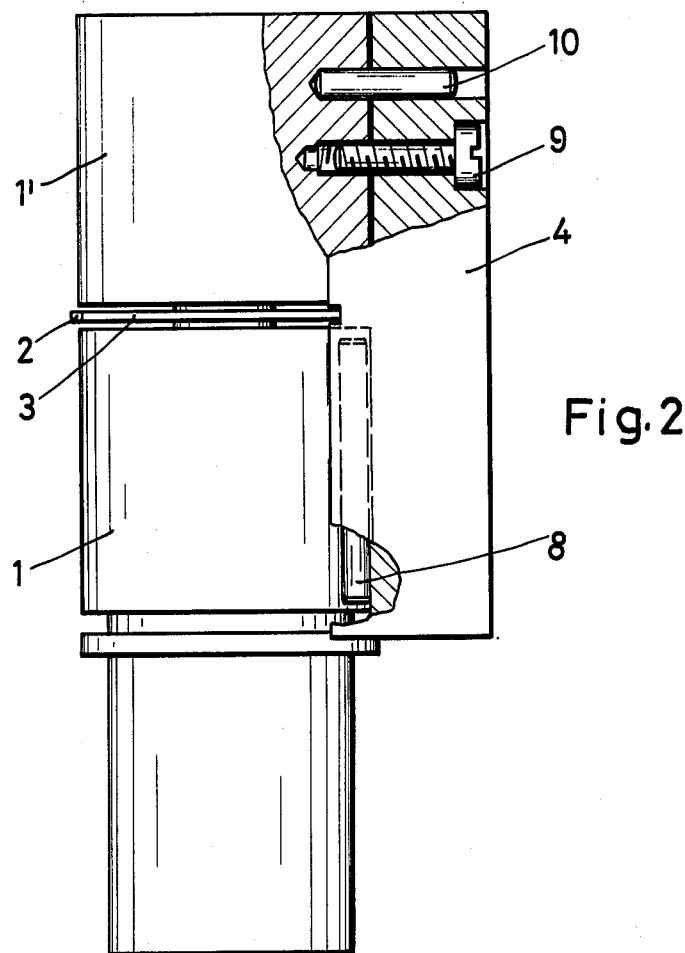
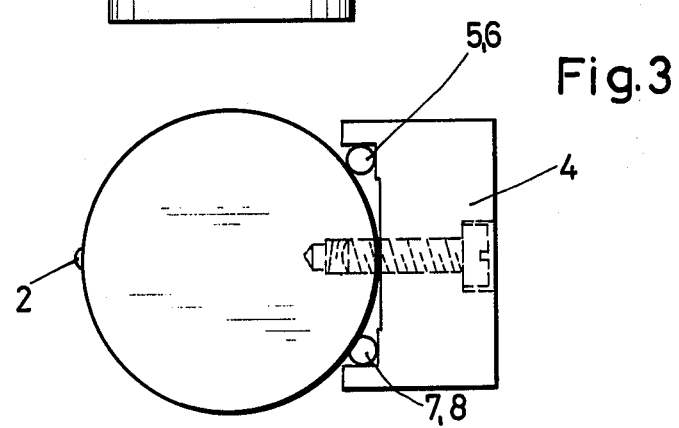

DEVICE FOR RECORDING AND REPRODUCING SIGNALS WITH A TAPE-LIKE CARRIER

This is a continuation, of application Ser. No. 663,080, filed Mar. 2, 1976.

CROSS-REFERENCE TO RELATED APPLICATION

Reference is had to the patent application to Peter Gunschmann, Ser. No. 604,626, filed Aug. 14, 1975, now U.S. Pat. No. 3,990,110 and having the same assignee as the instant patent application.

BACKGROUND OF THE INVENTION

The invention relates to a device for recording and reproducing signals with a tape-like carrier by the inclined track method.

Typically, a magnetic tape device using the slanting track method uses a magnetic tape drawn tightly in a helical path around two substantially co-axial guide cylinders spaced apart. In the space between the cylinders, there is a rotatable head wheel carrying the recording and reproducing heads. Usually, one of the cylinders contains the driving motor for the head wheel. For this type of magnetic tape device, it is important that the guide cylinders be manufactured and positioned with precision.

The aforementioned patent application Ser. No. 604,626, now U.S. Pat. No. 3,990,110 is incorporated herein by reference and forms a part of the instant disclosure.

One known way for endeavoring to exactly position the guide cylinders is to place the cylinders into a supporting piece so that the surface of the cylinders presses against the plane surfaces of the supporting piece. This arrangement requires the plane surfaces of the supporting piece to be manufactured with great precision and does not permit possible corrections after the assembly of the parts.

SUMMARY OF THE INVENTION

One of the principal objects of the invention is an improved device for recording and reproducing signals with a tape-like carrier by the inclined track method.

A further object of the invention is an adjustable and relatively inexpensive arrangement for improving a magnetic tape device which uses the inclined track method.

A further object of the invention is that for a device for recording and reproducing signals with a tape-like carrier by the inclined track method, comprising a support structure having a cavity defined therein, two substantially co-axial guide cylinders disposed in the cavity and a head wheel supporting recording and reproducing heads and disposed between the cylinders, the improvement including a plurality of support means of circular cross-section disposed in the cavity and engaging the cylinders.

The support means can be cylindrical or spherical and it is advantageous to use bearing needles which are readily available finely graduated to very fine tolerances. Moreover, the instant invention permits assembly tolerances to be compensated for by the selection of support means such as cylindrical pins of compensating dimensions.

A further advantage of the instant invention is that in an improved device including the support means of circular cross-section the guide cylinders can be removed for servicing and, if necessary, adjustments can be made by the changing of the support means. In addition, it is known that from time to time the head wheel must be replaced and this requires the removal of the guide cylinders. The improved device simplifies the servicing operation.

Further objects and advantages of the invention will be set forth in part in the following specification and in part will be obvious therefrom without being specifically referred to, the same being realized and attained as pointed out in the claims hereof.

The invention accordingly comprises the features of construction, combination of elements, and arrangement of parts which will be exemplified in a construction hereinafter set forth and the scope of the application of which will be indicated in the claims.

BRIEF DESCRIPTION OF THE DRAWINGS

For a fuller understanding of the nature and objects of the invention, reference should be had to the following detailed description, taken in connection with the accompanying drawings, in which:

FIG. 1 is a perspective view of a device according to the instant invention;

FIG. 2 is a side elevational view, partly in section, of the device of FIG. 1; and FIG. 3 is a plan view of the device of FIG. 1.

DESCRIPTION OF THE PREFERRED EMBODIMENTS

In carrying the invention into effect, one of the embodiments has been selected for illustration in the accompanying drawings and for description in the specification, reference being had to FIGS. 1 to 3.

The guide cylinders 1 and 1' are disposed in a cavity defined in support structure 4. Preferably, the cavity has a rectangular like cross-section. A head wheel 3 supporting recording and reproducing heads 2 is disposed between the guide cylinders 1 and 1' and is broadly depicted in the drawings. A plurality of support means of circular cross-section such as cylindrical pins 5, 6, 7, and 8 are disposed in the cavity and engaging the cylinders 1 and 1'. The selection of the diameters of the cylindrical pins 5, 6, 7, and 8 determines the spacing of each guide cylinders 1 and 1' with respect to the support structure 4. Bolts 9 extend through the support structure and engage threaded holes in the respective guide cylinders 1 and 1' in order to fix the position of the guide cylinders 1 and 1' with respect to the support structure 4. The position of the guide cylinders 1 and 1' with respect to the support structure 4 can be made more precise through the use of guide pins 10 which engage bores in the guide cylinders 1 and 1'.

If deviations arise in the shape of the guide cylinders 1 and 1' or in the surface of the support structure, it is possible to replace one or more of the cylindrical pins 5, 6, 7, and 8 with shorter cylindrical pins such as cylindrical pins 7' and 7''.

Furthermore, support means having a spherical shape can be used.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

I claim:

1. In a device for recording and reproducing signals with a tape-like carrier by the inclined track method, comprising a support structure having a cavity defined therein, two substantially coaxial guide cylinders disposed in said cavity, said cylinders and support structure having bores defined therein, and a head wheel supporting recording and reproducing heads disposed between said cylinders, the improvement comprising:

bolt means connecting said cylinders to said support structure, a gap of predetermined width being defined by said cylinders and opposite walls of said support structure, guide pins, within said bores and extending into said support structure and said cylinders, respectively, and a plurality of easily exchangeable support pins having a convex surface portion facing said cylinders and spaced apart from one another, said pins being disposed in said gap, engaging said cylinders and said opposite walls of said support structure as defined by said gap, whereby said predetermined width is selectively changeable by inserting support pins having a suitable diameter so as to obtain a desired width for said gap, and said guide cylinders are precisely aligned coaxially relative to each other and with respect to each of said opposite walls within said gap.

2. The device as claimed in claim 1, wherein said cavity has a substantially rectangular cross-section and a length substantially co-extensive with said cylinders.

* * * * *